Sept. 19, 1939.  H. KARLSSON ET AL  2,173,688
STATIC PRESSURE MEASURING TUBE
Filed May 24, 1938
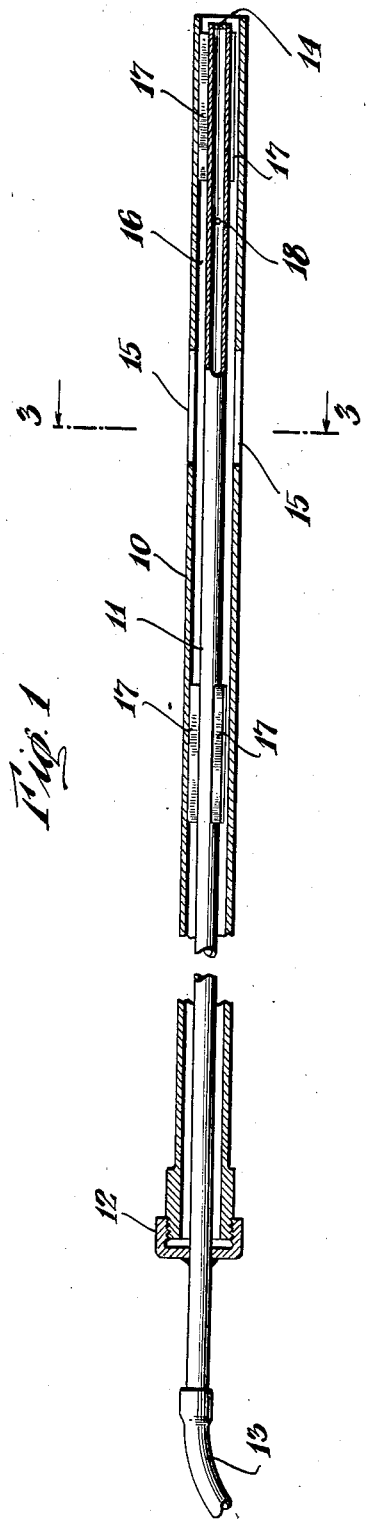
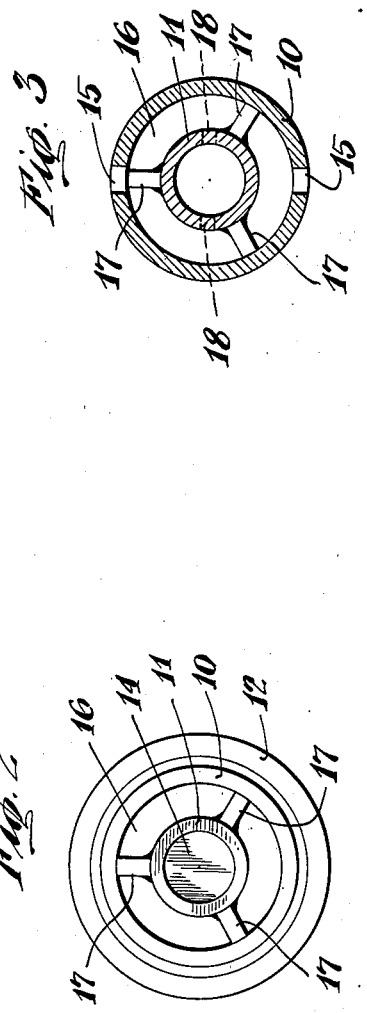
INVENTORS
Hilmer Karlsson
BY Joseph Waitkus
ATTORNEY Patented Sept. 19, 1939

2,173,688

UNITED STATES PATENT OFFICE 2,173,688

STATIC PRESSURE MEASURING TUBE

Hilmer Karlsson and Joseph Waitkus, Wellsville, N. Y., assignors to The Air Preheater Corporation, New York, N. Y.

Application May 24, 1938, Serial No. 209,676

4 Claims. (Cl. 73—31)

Our invention relates to measuring devices and particularly to improvements in apparatus for measuring the static pressure of a gas flowing through a flue.

In measuring the pressure of a gas stream, difficulty is frequently encountered in obtaining a true static pressure reading because at least part of the velocity head or impact pressure of the gas stream is added to or subtracted from the true static pressure. This is particularly true in obtaining a reading of gas flow through air preheaters where conditions encountered include bends and changes in the cross section of the gas duct, all contributing to produce a turbulent gas stream.

The main object of the invention is to provide apparatus for measuring the static pressure in a gas stream which will not be affected by the velocity of the gas.

In the drawing,

Fig. 1 is a longitudinal sectional view, partly broken away, of a static pressure measuring apparatus embodying our invention.

Fig. 2 is an end view of the apparatus; and

Fig. 3 is a cross-sectional view on the line 3—3 of Fig. 1.

Our improved static pressure measuring device comprises a pair of concentric tubes 10, 11, the larger tube 10 being open at one end while its opposite end is closed by a cap 12. One end of the smaller tube 11 extends beyond the cap 12 on tube 10 for connection by tubing 13 to a manometer or other gauge (not shown) suitable for indicating static pressure. The opposite end of the smaller tube 10 is closed as indicated at 14. The tubes 10, 11 are maintained spaced to form an annular chamber 16 between them by several sets of axially extending fins 17 secured to and spaced evenly above the smaller tube 11.

The wall of the larger tube 10 is formed with one or more apertures 15 to provide a flow of gas through the annular chamber 16 along the surface of the smaller tube 11. Where two or more apertures are employed, they are spaced evenly about the circumference of the tube 10 as shown in Figs. 1 and 3, illustrating two diametrically located slots 15 extending axially of the tube. The wall of the smaller tube 11 is formed with one or more small apertures 18 at a location spaced axially of the assembly from the position of the slots 15 in the wall of the surrounding tube 10. As shown two apertures 18 are formed at diametrically located positions in the wall of tube 11 but spaced axially thereof from each other.

In operation the apparatus is projected into a gas stream and a manometer connected to tubing 13 will then indicate the static pressure existing in the gas flowing along the surface of tube 11 through the chamber 16. The gas enters slots 15 and flows through the annular chamber 16 as a narrow film over the apertures 18 in the wall of tube 11 to exit from the open end of tube 10 or vice versa. In addition to spacing the tubes the fins near the end of the device also obviate any eddy currents or spiraling motion in the gas flowing between the tubes. The apparatus may be inserted in the gas stream at any angle to the direction of flow of the gas and it is also immaterial whether the gas flows from the slots 15 toward the open end of tube 10 or in the opposite direction because the pressure measured is that exerted by an undisturbed film of gas flowing over the small openings 18 in the smaller tube 11.

The apertures 18 in tube 11 are preferably spaced from the location of the slots 15 in the larger tube 10 by a distance five times or more the mean diameter of the free area between the tubes so that any disturbance produced as the gas changes direction by ninety degrees in entering or leaving through the slots 15 is not communicated to the apertures 18 in the inner tube, the arrangement providing a narrow film of gas passing over the aperture or apertures in the smaller tube. The total area of the openings or slots 15 in the wall of the outer tube 10 is preferably two and a half times or more the area of the annular space 15 between the tubes so that any disturbance resulting from a change in velocity effect in entering or leaving the annular space between the tubes may be eliminated.

Although an illustrative embodiment of our invention has been described and shown in detail herein it is to be understood that many changes and variations may be made without departing from the invention and therefore it is desired and intended to include all such changes and variations within the scope of the appended claims.

What we claim is:

1. Apparatus for measuring the static pressure of a gas comprising a tube adapted to be connected at one end to a pressure indicator and having its side wall formed at a point axially spaced from said end with one or more apertures; means closing the other end of said tube; a second tube surrounding said first mentioned tube in spaced relation to provide an annular chamber and having its side wall formed with an aperture of larger size than the aperture in said first mentioned tube and spaced axially therefrom.

2. Apparatus for measuring the static pressure of a gas comprising a tube adapted to be connected at one end to a pressure indicator and having its side wall formed at a point axially spaced from said end with one or more apertures; means closing the other end of said tube; a second tube surrounding said first mentioned tube in spaced relation to provide an annular chamber and having its side wall formed with an aperture of larger size than the aperture in said first mentioned tube and spaced axially therefrom; and longitudinally extending spacing members disposed circumferentially about the first mentioned tube to space the second mentioned tube therefrom, said members being located in positions spaced axially from the apertures in both tubes.

3. Apparatus for measuring the static pressure of a gas comprising a tube adapted to be connected at one end to a pressure indicator and formed at a point axially spaced from said end with one or more apertures; means closing the other end of said tube; a second tube surrounding said first mentioned tube in spaced relation to provide an annular chamber and formed with a pair of diametrically located, axially extending slots spaced axially from the apertures in said first mentioned tube.

4. A device of the type described comprising a pair of concentric tubes each having several circumferentially located apertures formed in their walls, the apertures in the wall of the larger tube being of greater area than those in the smaller tube and spaced axially therefrom; means closing one end of the smaller tube; means for connecting the opposite end of the smaller tube to pressure indicating apparatus; and means spacing said tubes to form an annular chamber through which gas may pass to flow across the apertures in the smaller tube in a path between the apertures in the larger tube and the end thereof adjacent the closed end of the smaller tube when the assembly is projected into a gas stream to expose the apertures in the larger tube.

HILMER KARLSSON.
JOSEPH WAITKUS.